(12) United States Patent
Todd et al.

(10) Patent No.: US 11,824,883 B2
(45) Date of Patent: Nov. 21, 2023

(54) VARIABLE DCF SECURITY SCORES AND DATA THREAT PORTFOLIO VIEWS

(71) Applicant: EMC IP Holding Company LLC, Hopkinton, MA (US)

(72) Inventors: Stephen J. Todd, Center Conway, NH (US); Riaz Zolfonoon, Concord, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 178 days.

(21) Appl. No.: 16/917,042

(22) Filed: Jun. 30, 2020

(65) Prior Publication Data

US 2021/0409436 A1 Dec. 30, 2021

(51) Int. Cl.
*H04L 9/40* (2022.01)
*H04L 9/06* (2006.01)
*H04L 9/00* (2022.01)

(52) U.S. Cl.
CPC ........ *H04L 63/1433* (2013.01); *H04L 9/0643* (2013.01); *H04L 63/1416* (2013.01); *H04L 63/1441* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2019/0138423 | A1* | 5/2019 | Agerstam | H04L 41/145 |
| 2019/0379699 | A1* | 12/2019 | Katragadda | H04L 63/1425 |
| 2020/0358807 | A1* | 11/2020 | Connell | H04L 41/142 |
| 2021/0056562 | A1* | 2/2021 | Hart | G06F 16/27 |

OTHER PUBLICATIONS

Qamar, A., et al., 2019. Mobile malware attacks: Review, taxonomy & future directions. Future Generation Computer Systems, 97, pp. 887-909. (Year: 2019).*
Eliash, C., et al., 2020. SEC-CU: the security of intensive care unit medical devices and their ecosystems. IEEE Access, 8, pp. 64193-64224. (Year: 2020).*

* cited by examiner

*Primary Examiner* — Christopher J Brown
*Assistant Examiner* — Edward X Long
(74) *Attorney, Agent, or Firm* — Workman Nydegger

(57) ABSTRACT

One example method includes detecting a threat in a data confidence fabric, assigning a data confidence score to data implicated by the threat, generating trust insertion metadata concerning the threat, creating a ledger entry based on the data confidence score and the trust insertion metadata, and using the ledger entry to determine an overall data confidence score for the data confidence fabric. A data threat portfolio view is generated based on the data confidence score and the trust insertion metadata, and the data threat portfolio view is presented to a user.

19 Claims, 10 Drawing Sheets

VARIABLE DCF SECURITY SCORES AND DATA THREAT PORTFOLIO VIEWS

FIELD OF THE INVENTION

Embodiments of the present invention generally relate to data confidence fabrics (DCF) that may include Internet of Things (lot) devices. More particularly, at least some embodiments of the invention relate to systems, hardware, software, computer-readable media, and methods for the definition and use of variable data confidence fabric security scores, and associated data threat portfolio views.

BACKGROUND

Data confidence fabrics are a type of network that can be useful for evaluating data and assigning confidence scores to the data as it passes through the DCF. Like other networks, a DCF may be susceptible to attacks by malicious actors and code. However, it can be difficult, or impossible, to usefully evaluate the threats and attacks, and assign data confidence scores that accurately reflect the significance of such threats and attacks. As well, there is no adequate mechanism to present an overview of the security state of a DCF.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
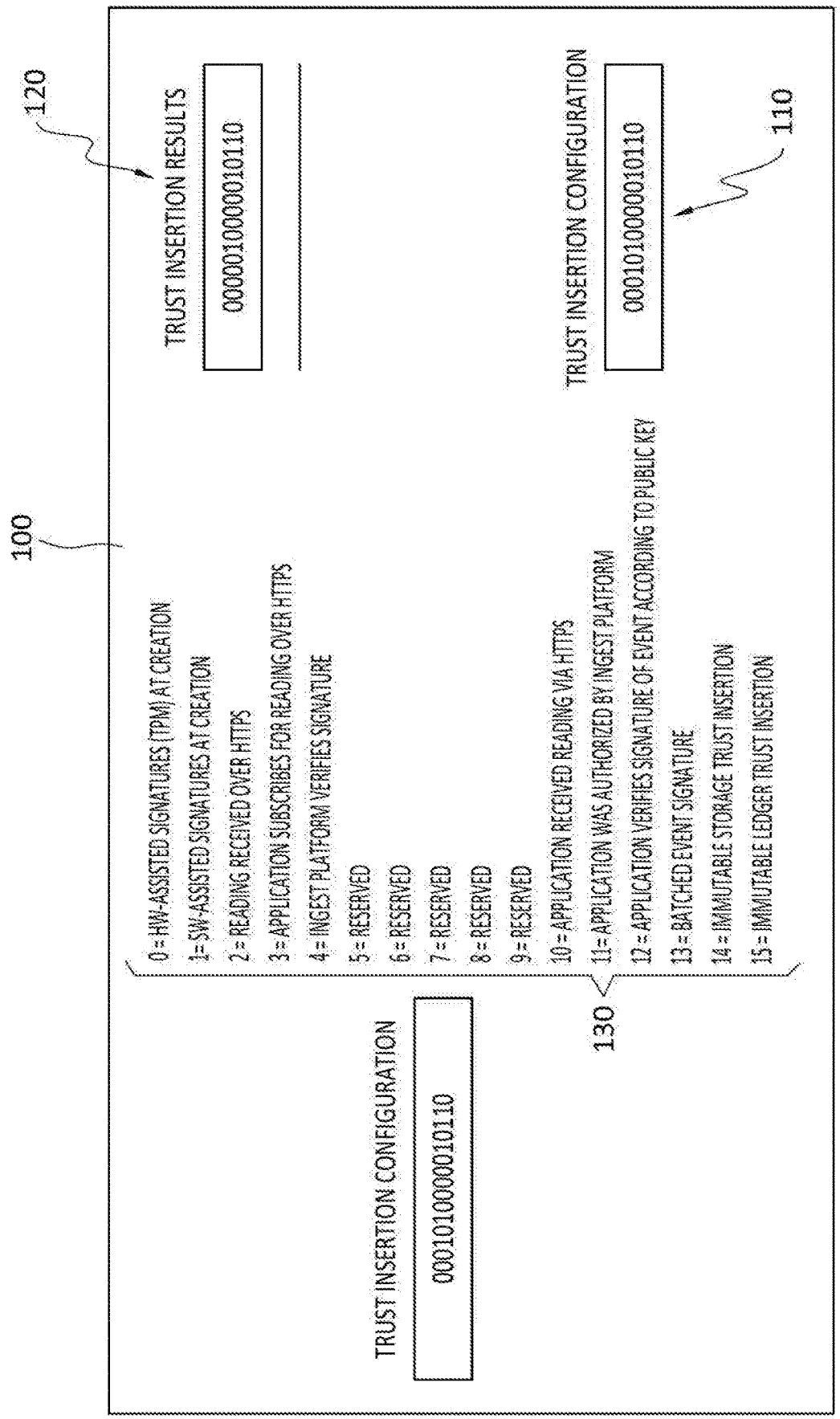
FIG. 1 discloses aspects of example bitmaps for trust insertion information.

Embodiments of the present invention generally relate to data confidence fabrics (DCF) that may include Internet of Things (lot) devices. More particularly, at least some embodiments of the invention relate to systems, hardware, software, computer-readable media, and methods for the definition and use of variable data confidence fabric security scores, and associated data threat portfolio views.

In general, example embodiments of the invention may implement any one or more of a variety of functionalities. For example, embodiments of the invention may include an algorithm that may be employed, such as by the RSA IoT Security Monitor (https://rism.rsalabs.com/) (which may be referred to herein simply as "RISM"), that may create a variable, or dynamic, confidence score, rather than simply a binary '0' or '1' confidence score. Thus, the variable, or analog, confidence score may be any number from 0 to 1, inclusive of both integers and non-integers. Further, the algorithm may take into account a variety of attack metadata to create the variable confidence score.

The RISM technology is one example of a security technology, but the scope of the invention is not limited to, nor necessarily requires, the use of RISM. The RISM technology/platform may function as a trust insertion component insofar as it may be able to insert trust information concerning data based on monitoring and/or other processes it has performed. It will be appreciated from this disclosure that at least some embodiments of the invention may provide for various features and functionalities that may supplement and improve upon the basic RISM functions.

Another functionality that may be implemented by one or more embodiments concerns the contribution of additional metadata, such as by RISM for example, about a current attack profile. Such metadata may, for example, incorporate workflow analysis performed by an operator in a SOC.

Some embodiments may employ a high-level DCF scoring algorithm that may be modified to pay particular attention to RISM metadata. Such algorithms may trigger various different confidence scores based on that metadata.

Finally, some embodiments may provide a portfolio viewing tool that may be built on top of a DCF in order to create a risk or threat map for all DCF data. This map may be used for various purposes, such as to evaluate, and develop an action plan based upon, trust insertion ledge entries and their respective scores.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment may provide for granularity in a confidence score beyond simply a '1' or '0' score. An embodiment of the invention may enable assigning and/or varying a confidence score based upon a particular type of attack on a DCF. An embodiment may enable association of attack metadata with data passing through a DCF. An embodiment may enable after-the-fact reconstruction of attacks that have taken place on data that has passed through a DCF. An embodiment of the invention may include a data risk portfolio that may creation of an overall view of data risk in an environment such as a DCF.

A. Overview and Comparative Examples

The following overview and comparative examples are provided as context for better illustrating various aspects of some example embodiments, and are not intended to limit the scope of the invention in any way.

Figure 2:
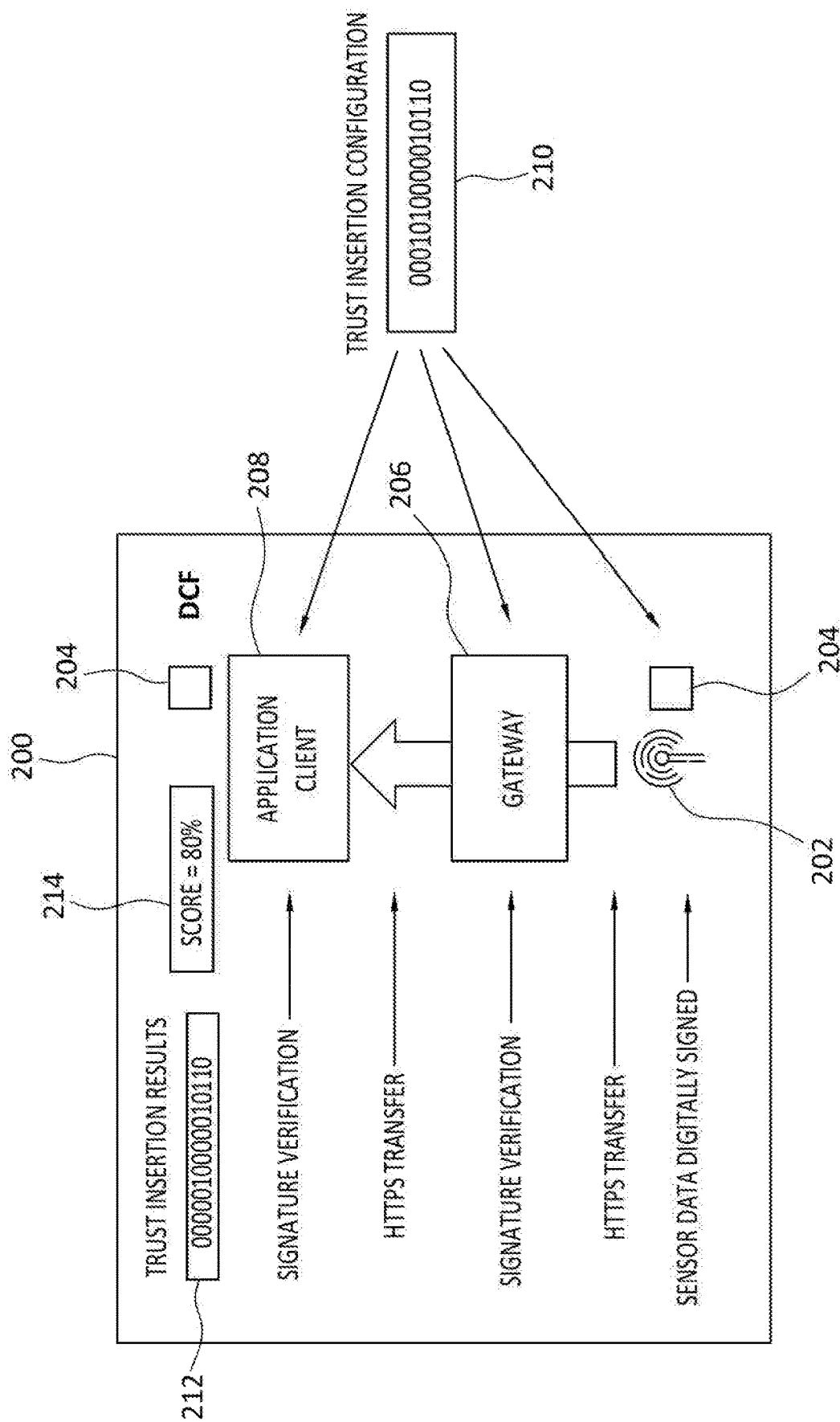
FIG. 2 discloses a portion of an example DCF and related trust insertion information.

With reference first to FIG. 1, a configuration 100 is indicated that includes trust insertion configuration and a trust insertion results configuration, each of which may be expressed in the form of a respective bitmap 110 or 120. In general, the bitmaps 110 and 120 may each comprise one or more bits, each representing an event such as a trust insertion operation, or other data, and each having a binary value of 0 or 1. The example bitmap 110 may comprise any number of bits, such as the 16 different bits as shown in the bit table 130. In general, the bitmap 110 defines a trust insertion configuration that specifies which trust insertion technologies should be used during DCF operations. Thus, in the example of FIG. 1, the following trust insertion operations are indicated as being implemented: Bit 1: software-assisted digital signature; Bit 2: use of HTTPS to transport data; Bit 4: verification of signature by the ingest platform; Bit 10: any client wishing to consume the data must do so via HTTPS; and, Bit 12: the client must verify the signature. FIG. 2, discussed below, discloses a possible outcome of the application of the example trust insertion configuration represented by bitmap 110.

In FIG. 2, a portion of a DCF 200 is disclosed that has a 3-layer IoT/Edge configuration in which an lot device 202 such as a sensor, for example, generates data 204, such as a reading, and sends the data 204 to a gateway 206, which in turn sends the readings to an application client 208 that may process and/or use the data 204. In some example embodiments, the sensor may be a sensor configured to monitor and report on a physical aspect of an operating environment, such as temperature, pressure, or humidity for example. In some embodiments, the sensor may monitor and report on one or more aspects of a computing environment such as bitrate or bandwidth for example. As these examples illustrate, the terms IoT device, and sensor, are intended to be broadly construed and are not limited to any particular device(s). In the illustrated configuration, when the three layers, that is, IoT device 202, gateway 206, and application client 208, function as part of the DCF 200, each layer may attempt to insert respective trust metadata as specified in the bitmap 210.

When the data 204 arrives at the application client 208, a separate bitmap 212, indicating trust insertion results, may be generated, and a corresponding confidence score 214 calculated. In the example of FIG. 2, the bitmap 212 highlights that one of the trust insertion methods, particularly, the signature verification of the application client (Bit 4), has failed. That is, in the bitmap 210, Bit 4 is set to '1,' indicating that signature verification of the application client should be performed. In bitmap 212 however, Bit 4 is set to '0,' indicating that signature verification has failed for some reason. Thus, since only 4 of the 5 trust insertion methods executed properly in this example, a confidence score 214 of 80% is assigned to the data 204.

Figure 3:
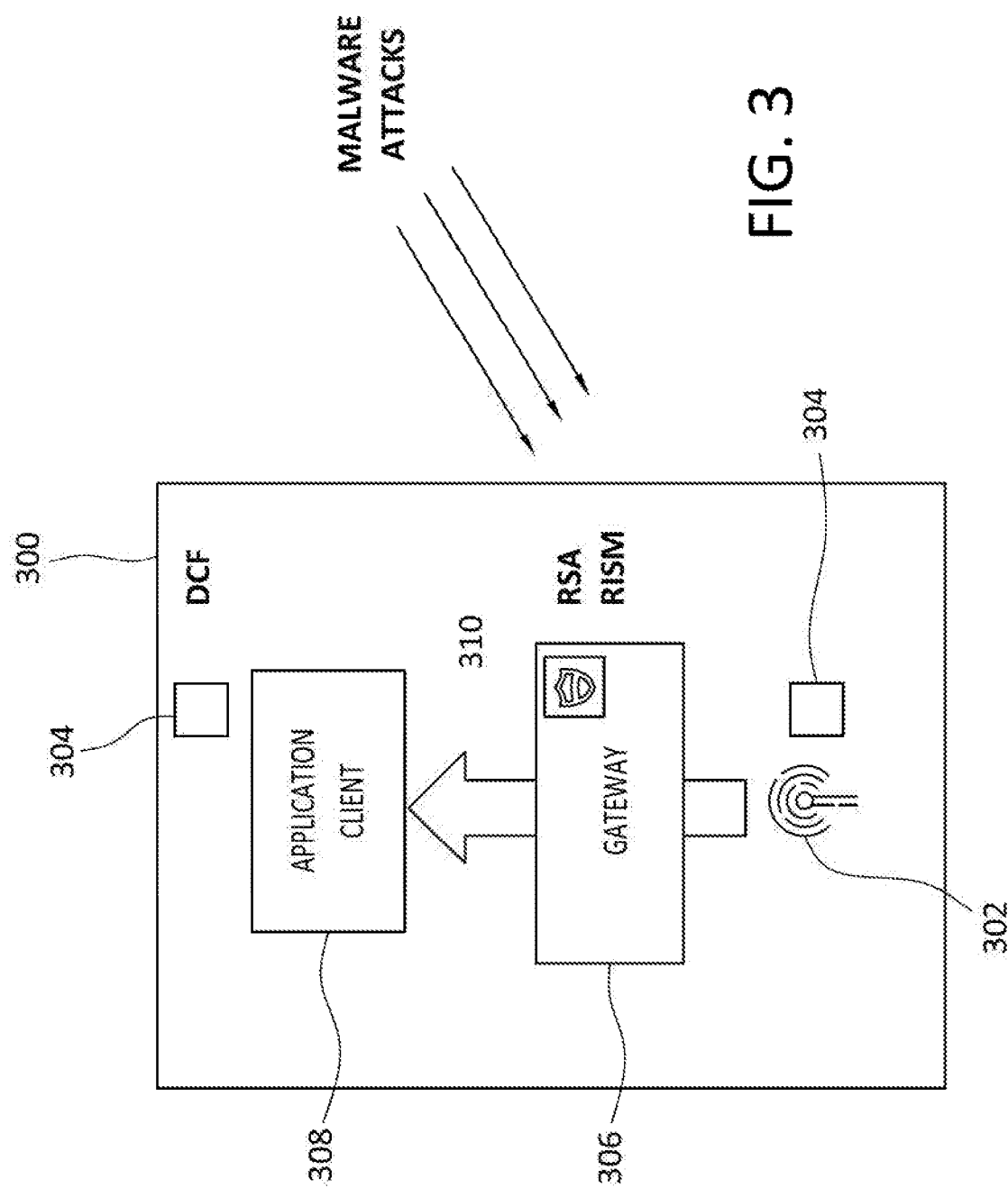
FIG. 3 discloses a portion of an example DCF that incorporates security technology at a gateway.

A concern with a configuration such as disclosed in the comparative example of FIG. 2, is the potential for attacks on the DCF 200. Thus, some embodiments of the invention may comprise a trust insertion technology that may be operable to monitor for such threats, and that may implement preventive actions based on data gathered during a monitoring process. One non-limiting example of such a trust insertion technology is RISM, which may operate to observe network traffic for potential security anomalies and to monitor devices, such as IoT devices, and detect compromised devices based on anomalous behavior. FIG. 3 discloses one example of an embodiment in which RISM may be installed on a gateway as a strategy to repel malware attacks.

More specifically, FIG. 3 discloses a portion of a DCF 300 that has a 3-layer IoT/Edge configuration in which an lot device 302 such as a sensor, for example, generates data 304, such as a reading, and sends the data 304 to a gateway 306, which in turn sends the readings to an application client 308 that may process and/or use the data 304. In general, RISM 310, or other technology of comparable functionality, may operate to protect the data 304 flowing through the gateway 306 and/or other layers of the DCF 300. As shown, RISM 310 may reside at the gateway 306 but in other embodiments may additionally, or alternatively, reside at one or more other layers of a DCF.

While the use of security technology such as RISM in a DCF context may provide some useful functionality, some challenges may arise as well. In the example of FIG. 2, the use of a "Trust Insertion Results" bitmap 212 may be useful to indicate whether or not a trust insertion technology performed properly. For example, signature generation for sensor data may be expected to work most of the time, which results in a bit value of "1" being generated. Similarly, signature validation may be relatively straightforward, that is, either the public key confirms the signature or it does not. As noted in the discussion earlier herein, technologies such as RISM may report a value of "1" when they are properly installed and running, and "0" when they experience a failure, such as an execution failure. In some cases however, a technology that only returns a value of "1" may not be conveying an adequate picture of the actual circumstances. This is explored further in the following discussion of a comparative example disclosed in FIG. 4 which discloses a security technology such as RISM operating in a DCF.

Figure 4:
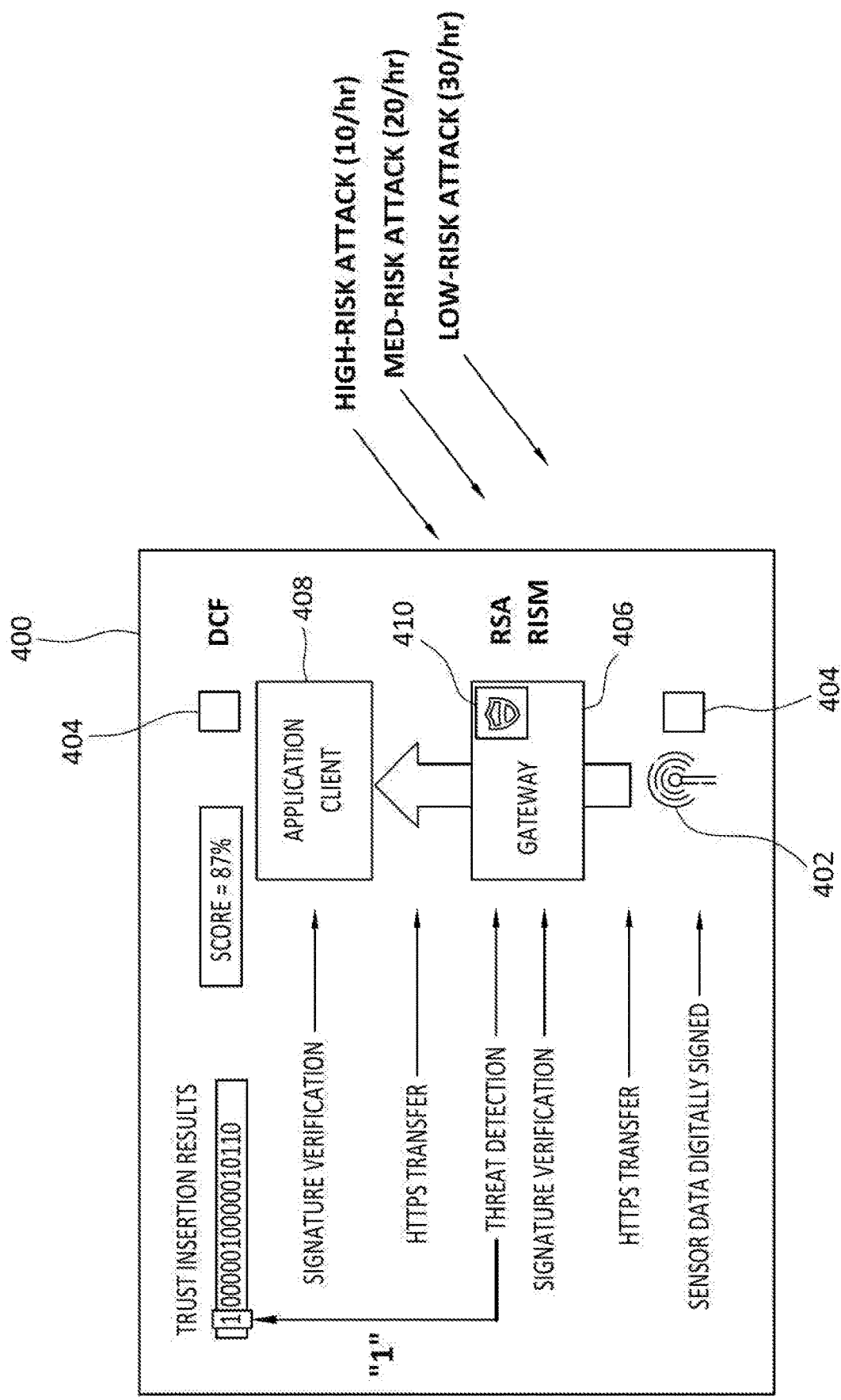
FIG. 4 discloses a portion of an example DCF with security technology, and related trust insertion information.

In particular, FIG. 4 discloses a portion of a DCF 400 that has a 3-layer IoT/Edge configuration in which an lot device 402 such as a sensor, for example, generates data 404, such as a reading, and sends the data 404 to a gateway 406, which in turn sends the readings to an application client 408 that may process and/or use the data 404. In general, RISM 410 may operate to protect the data 404 flowing through the gateway 406 and/or other layers of the DCF 400. As shown, RISM 410 may reside at the gateway 406 but in other embodiments may additionally, or alternatively, reside at one or more other layers of a DCF. In general, RISM 410 may serve to detect attacks and inform the DCF 400 that it is running successfully by returning a value of "1," which, in turn, may increase the confidence score from 80% (as in the comparative example of FIG. 2) to 87%. However, this increase in confidence may not accurately convey the actual circumstances. For example, if RISM 410 is detecting an average of 10 high-risk attacks per hour, there may be a question as to whether any of those attacks stolen data, or attempted to alter data. If so, then a reduction, rather than an increase, in the confidence score of the data may better reflect what is actually happening in the DCF 400.

C. Aspects of Some Example Embodiments

The comparative example of FIG. 4 is thus illustrative of a configuration, and circumstances, where a technology such as RISM is not adequate to fully capture what is happening in an environment such as a DCF. Following are some examples of functionalities provided by embodiments of the invention, and how those may apply to, and resolve, particular scenarios that may be problematic. As such, these functionalities constitute improvements to, among other things, the RISM technology.

One such scenario concerns the inability of technologies such as RISM to vary confidence scores based on particular types of attacks. Such attacks or threats may include, for example, botnets, rootkits, trojans, ransomware, viruses, worms, adware, and spyware. Each one of these technologies may represent a different kind of threat to the data flowing through a DCF ecosystem. Moreover, each threat may have a different type of impact to the overall confidence in the data. Thus, embodiments of the invention may provide a mechanism that may be employed to raise or lower the confidence level of particular data based on the types of attacks detected.

As another example, monitoring functionality may detect threats, but may not be adequate to trigger responsive actions. For example, embodiments of the invention may enable implementation of a change to, such as a lowering of, the confidence score of data passing through the gateway, so as to thereby indicate the danger to the DCF that includes the gateway. As well, embodiments of the invention may detect a specific type of threat, such as spyware for example, and notice that the device, such as a gateway for example, on which the spyware is running may not be sufficiently protected from the threat.

Embodiments of the invention may provide for the attachment of context information, such as attack metadata for example, to data flowing through a DCF. In contrast, technologies such as RISM are unable to attach any context about the type of attacks that were being experienced while that data was flowing through the DCF.

As another example, embodiments of the invention may enable or implement new functionalities concerning historical data recorded in a DCF. Particularly, such embodiments may enable an engineer/analyst to forensically reconstruct what type of attacks on that data were occurring at the time the data was created, and during the subsequent journey of that data through a DCF.

Further examples of new functionalities that may be implemented by embodiments of the invention concern a data risk portfolio that may be created and employed in some embodiments. In some embodiments, a DCF may be employed in association with a "data portfolio" viewing tool that may be used to profile the confidence scores of a wide variety of data assets being recorded in DCF ledgers worldwide. Such embodiments may incorporate a basic monitoring technology such as RISM that is leveraged to create a world-wide view of data risk, for example, the types of attacks are occurring, have occurred, and what specific data sets experienced which types of attacks. According to some embodiments, the data risk view may indicate, for example, which pockets or portions of infrastructure in the DCF may be unprotected from current and/or expected attacks.

Finally, some embodiments of the invention may enable re-classification of an alert issued by a security technology. For example, it may be the case that an alert may be a false positive, that is, an alert indicates a problem when, in fact, there is no problem. Such a false positive may be identified, for example, when a Security Operations Center (SOC) performs forensic analysis of DCF data and/or events after the fact. In this case, a re-classification of the alert may result in a different level of trust being assigned to the data, for example, a different confidence score.

Figure 5:
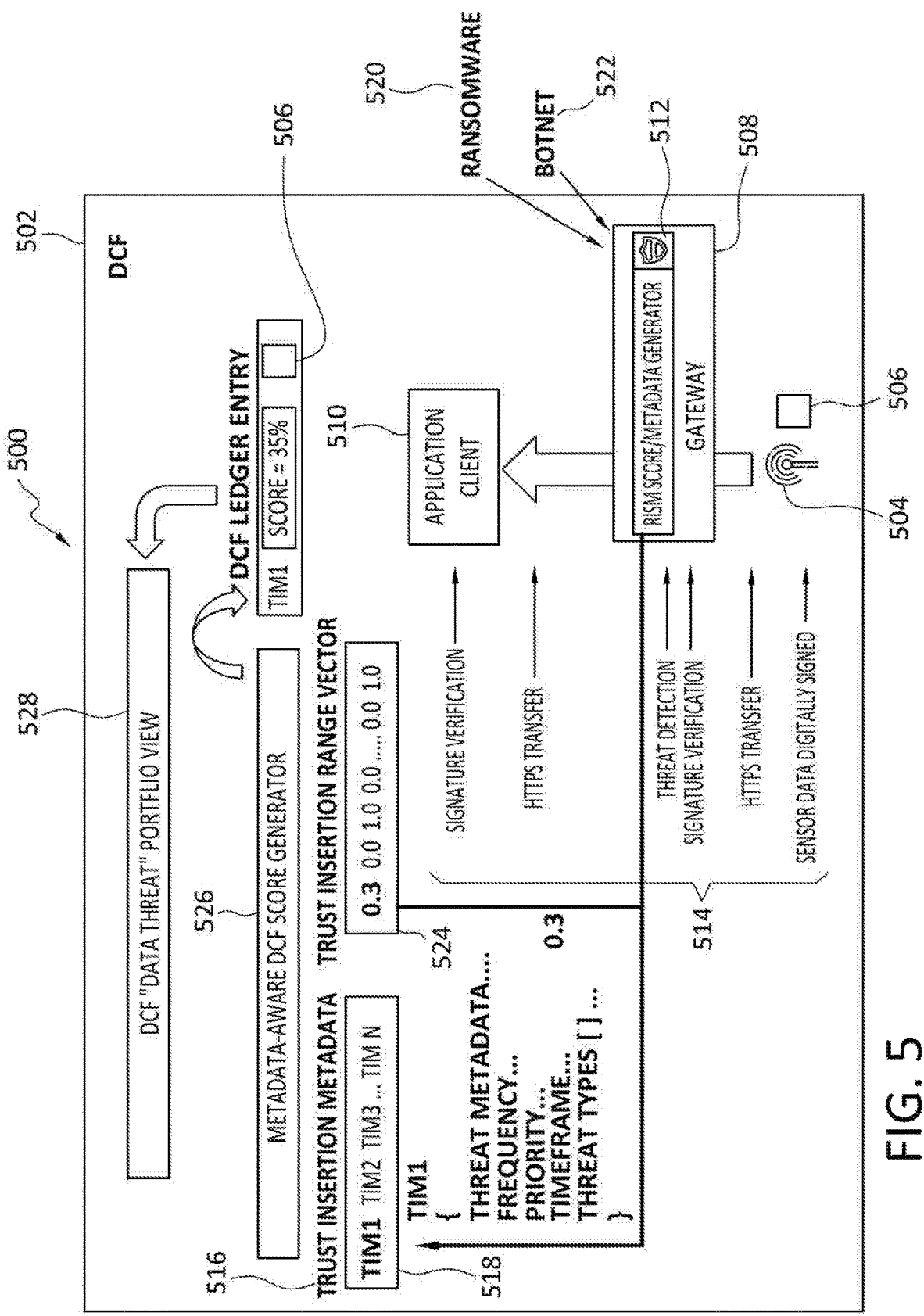
FIG. 5 discloses an example DCF.

With reference now to FIG. 5, details are provided concerning aspects of an embodiment of the invention. As noted herein, embodiments of the invention may operate in connection with data generated and/or collected by devices such as IoT devices, for example. For the purposes of this disclosure, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With particular attention now to FIG. 5, an example architecture 500 is disclosed that may comprise one or more DCFs 502, and/or portions thereof. The DCF 502 may have a 3-layer IoT/Edge configuration in which an Iot device 504 such as a sensor, for example, generates data 506, such as a reading, and sends the data 506 to a gateway 508, which in turn sends the readings to an application client 510 that may process and/or use the data 506. In general, a security technology 512, such as RISM for example, may operate to protect the data 506 flowing through the gateway 508 and/or other layers of the DCF 502. As shown, the security technology 512 may reside at the gateway 406 but in other embodiments may additionally, or alternatively, reside at one or more other layers of a DCF. Various types of trust metadata 514 may be inserted by one or more components, at one or more layers of the DCF 502.

With particular reference to the security technology 512, if it is not detecting any malicious activity, the security technology 512 may return a trust score of "1," essentially indicating an assessment by the security technology 512 that it has 100% confidence that the data is not under any sort of threat. In addition to generation of the trust score, the security technology 512 may also generate Trust Insertion Metadata (TIM) 516, examples of which may include: any relevant information about threats that the security technology 512 has detected; the frequency with which those threats were detected; an assessment of the relative danger of those threats (e.g., High, Medium, Low priority); timeframe during which the security technology 512 made those observations; and, the types of threats that were observed, their frequency, and possibly whether or not the gateway 508, or other DCF element(s), is able to repel that kind of attack. Thus, if there are no threats detected, these TIM 516 fields may be empty, with the possible exception of the timeframe field. As further indicated in FIG. 5, the fields and associated data/metadata may be used to collectively define a Trust Insertion Metadata (TIM) vector 518 that may include any type and number of fields. In some embodiments, one or more of the fields in the TIM vector 518 may be replaced with a respective pointer to the associated metadata.

It is noted that a TIM vector is not limited to including information about threats such as may be detected by a security technology. More generally, a TIM vector may include any type of respective trust insertion metadata inserted by one or more components of a DCF. Thus, threat-related metadata is but one example of trust insertion metadata that may be included in a TIM vector, and is presented only by way of example and not limitation. Similarly a TIR vector is not limited to including confidence scores relating to threats such as may be detected by a security technology. More generally, a TIR vector may include confidence scores generated on various bases by one or more components of a DCF. Thus, threat-related confidence scores are but one type of confidence score that may be included in a TIR vector, and are presented only byway of example and not limitation. As disclosed elsewhere herein, trust insertion metadata, and data confidence scores, concerning threats, may be aggregated with other trust insertion metadata and other data confidence scores from other DCF components. This aggregated information may be used as a basis for generating an overall DCF confidence score, and/or DCF data threat portfolio views.

Figure 6:
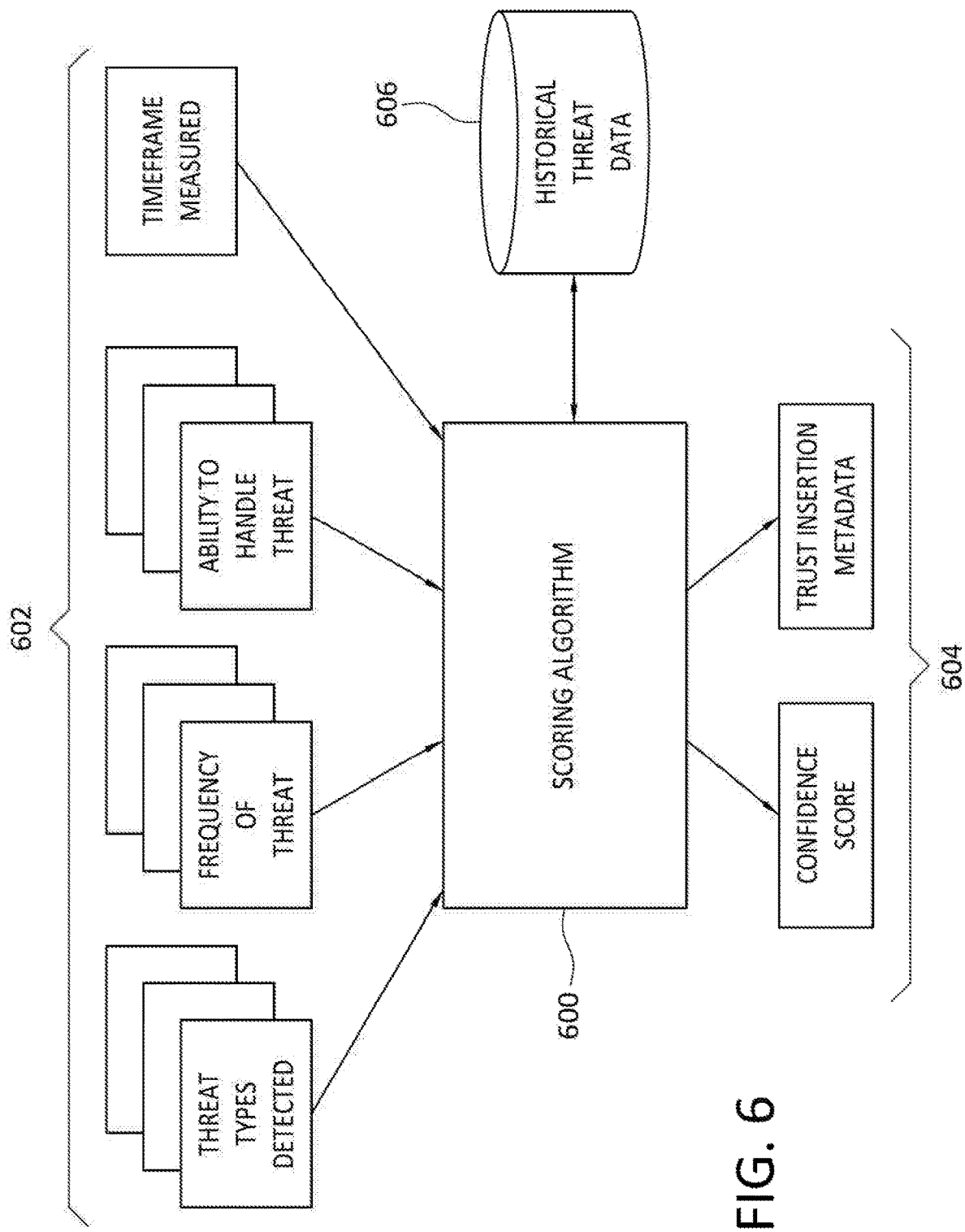
FIG. 6 discloses an example scoring algorithm.

In general, and with reference now to FIG. 6, when a threat is detected by the security technology 512, an algorithm 600 according to one or more embodiments of the invention may be run which may modify, such as by reducing, an initial confidence score generated by the security technology 512. The algorithm 600 may also be referred to herein as a 'scoring algorithm' and may, in some embodiments, be incorporate as an element of a security technology such as the security technology 512, although that is not necessarily required and the algorithm 600 may be implemented as a stand-alone entity in some embodiments. In some embodiments, the functionality of the algorithm 600 may be limited to generation of confidence scores and/or trust insertion metadata based on receipt of data/metadata received from a security technology concerning actual and/or potential threats detected by the security technology.

As shown in FIG. 6, such an algorithm 600 may employ a variety of inputs 602 that may be processed by the algorithm 600 to generate various outputs 604. In some embodiments, one, some, or all, of the inputs 602 may be provided by a security technology, although that is not necessarily required and inputs may be additionally, or alternatively, received from other sources within or external to the DCF.

The algorithm 600 may also communicate with a historical threat database 606. As shown in FIG. 6, example inputs 602 to the algorithm 600 may include, but are not limited to, one or more of 'Threat Types Detected,' 'Frequency of Threat,' 'Ability to Handle Threat,' that is, the ability of an element such as a gateway for example to deal with a perceived threat, and 'Timeframe Measured.' Outputs 604 may include, but are not limited to, any one or more of a 'Confidence Score,' and 'Trust Insertion Metadata.'

With continued reference to FIGS. 5 and 6, an algorithm, such as the algorithm 600 for example, may be constructed to implement a variety of different functions, examples of which follow, and any one or more of which may be employed in a particular embodiment. For example, an algorithm may treat all threats the same, and then deduct the same fractional confidence penalties for each, so as to reduce a confidence score, based on how many threats overall have been experienced recently. To illustrate, if three threats are detected, the algorithm may deduct a penalty of 0.2 for each, to arrive at an overall confidence score of 0.4 (1−(3)(0.2)). As another example, an algorithm may assign a confidence penalty deduction based on the type of threat detected. For example, the algorithm may assign a penalty of 0.5 to ransomware 520 (high priority threat) and 0.2 for a botnet 522 (low-to-medium threat). When both of these threats are detected by a security technology, the algorithm may subtract a penalty of 0.7 (0.5+0.2) from an initial assumed confidence score of 1.0 to arrive at a confidence score of 0.3 for any data passing through a gateway, or other DCF layer, where the threats were detected. In a further example, an algorithm may deduct penalties if the threat being detected cannot be adequately handled by the device, such as a gateway for example, where the detection took place. As well, and particularly indicated in FIG. 6, an algorithm may query a historical database 606, which may be located on-site at a user premises, or off-site, and deduct points from a confidence score based anomalous behavior data identified in the query. Further, an embodiment of an algorithm may employ any one or more of the aforementioned functionalities, in any combination. In some instances, it may be the case that the type and/or number of attacks on the DCF is/are of such intensity that a confidence score of zero may be returned by the security technology to the algorithm, indicating that the security technology has no confidence that the data passing through the layer where the threat(s) was/were detected is secure. Finally, it may be the case that a security technology is able to detect a breach, and associated data exfiltration. In this example, a lower confidence score may not necessarily be assigned to the data by the algorithm, but such detection may at least alert the enterprise that an unauthorized duplicate copy of the data may exist in a "black market" and hence could impact the value of the data to a party interested in acquiring the data for a legitimate purpose, such as a potential data exchange client for example.

With continued reference to the foregoing example functionalities of an algorithm, such as the algorithm 600, and reference as well to FIGS. 5 and 6, it is noted that the rationale, or algorithm for assigning a confidence score, can be put into the trust insertion metadata as well. As shown in FIG. 5 in particular, one or more trust insertion score values may be combined together to define a Trust Insertion Range (TIR) vector 524.

Thus, the example trust insertion score of 0.3, generated by the algorithm 600 based on information, such as the inputs 602, about the attacks by the ransomware 520 and botnet 522, may be placed in the TIR vector 524, which is configured to operate with scores having dynamic ranges, as opposed to simply operating with binary success/failure status scores expressed as either '1' or '0.' As well, and noted earlier, the trust insertion metadata 516 generated by the algorithm may be recorded in the TIM vector 518. With continued reference to FIG. 5, other trust insertion processes, such as authentication, signature validation, and others, may still choose to return a "0" or a "1" status, and such trust insertion processes may, or may not, generate trust insertion metadata associated with their respective confidence scores or statuses.

More generally, and with further reference to the examples of FIGS. 5 and 6, inputs such as inputs 602, may be received by an algorithm 600, such as from a security technology. The algorithm 600 may then process the inputs 602 to generate outputs 604, examples of which include the confidence score 0.3 as shown in FIG. 5, and trust insertion metadata such as the trust insertion metadata 516 shown in FIG. 5. The confidence score output by the algorithm 600 may be inserted into a TIR vector such as the TIR vector 524, while the TIM output by the algorithm 600 may be inserted into at TIM vector such as the TIM vector 518.

Figure 7:
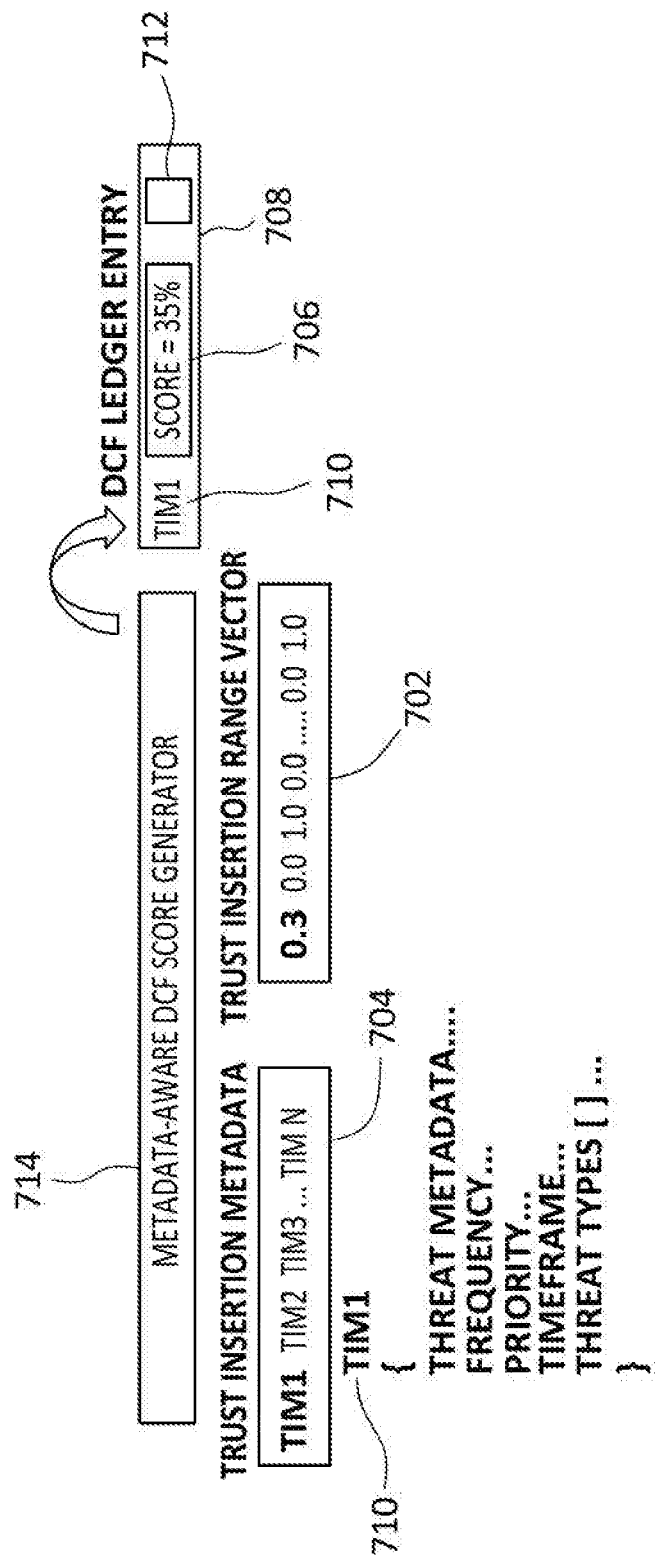
FIG. 7 discloses an example score generator.

With continuing reference to FIG. 5, and directing attention now to FIG. 7 as well, the variable scores from a TIR vector such as the TIR vector 524, and threat-specific metadata from a TIM vector such as the TIM vector 518, may be joined together with all of the other scores and metadata from other trust insertion components within a DCF, such as the DCF 502 for example. As shown in FIG. 7, information from a TIR vector 702 and a TIM vector 704 may be used to generate an overall confidence score 706 for the DCF. When the overall confidence score 706 is generated, it may be entered into a ledger as a ledger entry 708. In addition, the ledger entry 708 may contain a subset of the metadata, which may be some or all of the metadata. In the example of FIG. 7, trust insertion metadata related to threats is denoted at TIM1 710, and TIM1 710 may be included in the ledger entry 708. The ledger entry 708 may also include data 712 to which the TIM1 710 is related.

In more detail, FIG. 7 discloses an embodiment of a "Metadata-aware DCF Score Generator" (or 'score generator') 714 (526 in FIG. 5) that is able to factor the TIM(X) of one, some, or all, components of a DCF, as well as the confidence scores themselves. In the example of FIG. 7, an overall DCF confidence score 706 of 35% (out of 100%) is generated by the score generator 714 for inclusion in the ledger entry 708. The score generator 714 may also enter the threat metadata TIM1 710 as a way to explain the low value of the score 706.

In addition to generating overall DCF scores, and ledger entries, the score generator 714 may provide other functionalities as well. For example, the score generator 714 may examine trust insertion metadata on an individual TIM type basis. To illustrate, the score generator 714 may examine TIM1 710 to identify one or more specific types of threats, and/or may examine one or more of TIM2 . . . TIMn to identify other particular information provided by respective devices of the DCF. As well, and noted earlier, the score generator 714 may generate a dynamic overall confidence score for a DCF based on an aggregation of all device TIM values and/or based on an aggregation of all device confidence scores. Further, the score generator 714 may insert threat metadata, such as TIM1 710 (FIG. 7) into a DCF ledger entry 708. This may enable a higher level DCF Data Threat Portfolio view tool, an example of which is discussed below in connection with FIG. 8, to create historical and current overviews of the threats that have been, and/or are being, experienced across a DCF.

D. DCF Data Threat Portfolio

As discussed thus far, embodiments of the invention may provide for the implementation of various useful functionalities. Data collected and/or processed in connection with such functionalities may, in turn, enable the implementation of yet other useful functionalities, one example of which is DCF data threat portfolio viewing, as disclosed in FIG. 8 and discussed below. That is, FIG. 8 discloses an example of a tool that may be used to provide an overview of the threats, such as in the form of an overall threat profile, to the data that a DCF is managing. The tool may be a stand-alone entity (such as 528 in FIG. 5) or may be integrated into another entity such as, for example, a score generator. In at least some embodiments, the tool may present one or more views in graphical form.

Figure 8:
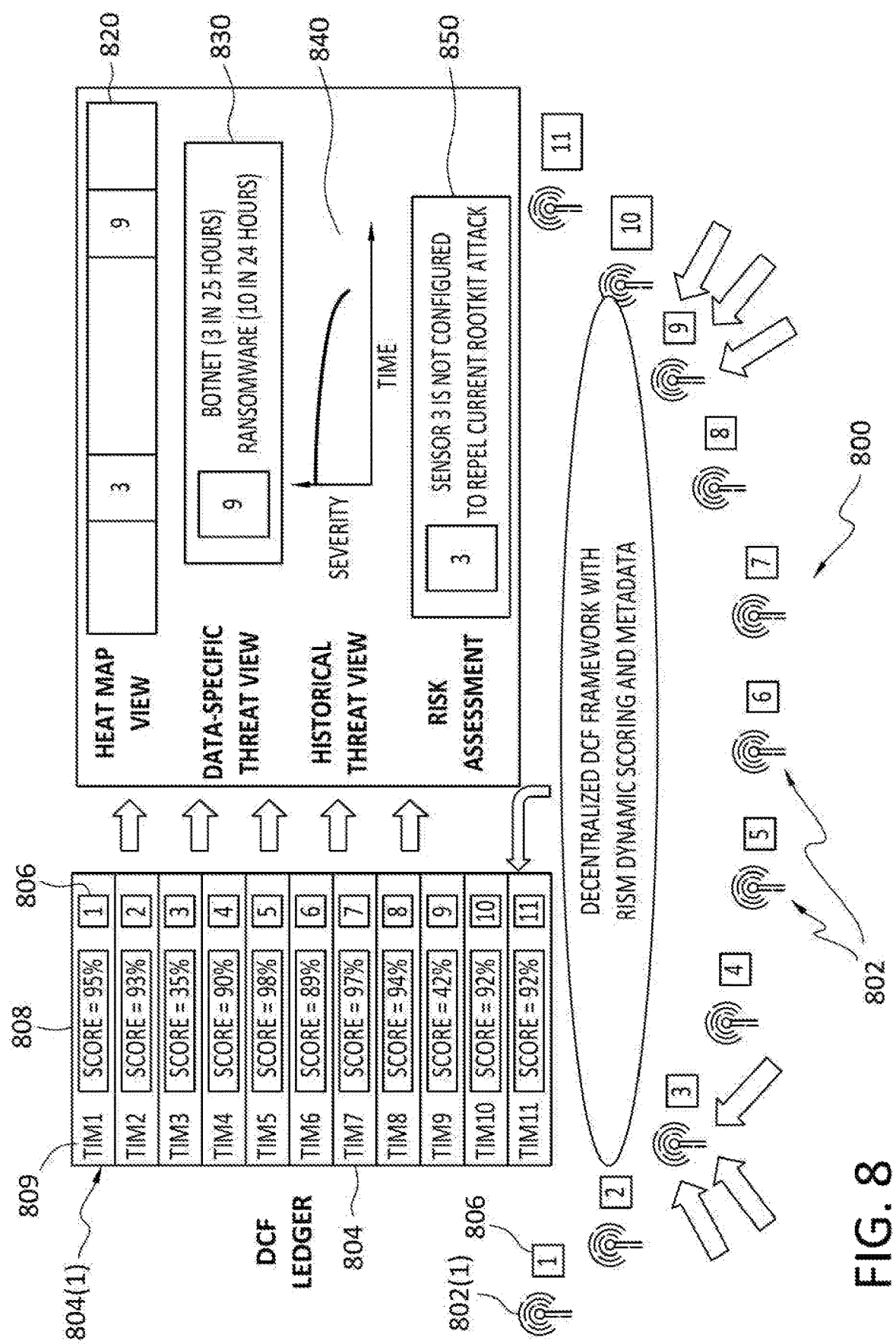
FIG. 8 discloses example data threat portfolio views.

In particular, FIG. 8 discloses an example DCF 800 ingesting and annotating sensor 802 data from across a broad geographical range. In the illustrative example, eleven different sensors 802 contribute respective different readings. In FIG. 8, a ledger 804 of the DCF may include one or more entries. The ledger 804 may, or may not, include one or more entries including the same types of information as the respective example ledger entries disclose in FIGS. 5 and 7. By way of illustration, in the ledger entry 804(1), data(1) 806 generated and/or collected by sensor 802(1) has been associated with a confidence score 808 of 95% based on the TIM1 809. Thus, as the sensor 802 data 806 is being ingested into the DCF 800, the security technology may analyze and record a respective threat profile that includes a respective confidence score and associated metadata for each piece of ingested data. The DCF 800 may then store an entry for each data item in the DCF ledger 804.

The ledger 804 may be queried to create one or more threat views that may beneficial to an enterprise such as a business. FIG. 8 discloses various possible views that may be defined using the information in the ledger 804. In some embodiments, one or more particular views may be generated in response to receipt of a query from a user that specifies information of interest to the user. Such views may be presented to a user by way of a graphical user interface (GUI) or any other type of UI. For example, in some embodiments, any one or more of the views may be presented to a user by an app on a smartphone or other mobile device. Additionally, or alternatively, one or more views may be presented at a terminal used by an administrator of an enterprise.

In one example, FIG. 8 discloses a heat map view 820. The heat map view 820 may disclose, for example, that out of the last-known ledger entries processed from all sensors 802(1) . . . 802(11), the respective data received from sensors 3 and 9 are associated with relatively low confidence scores, possibly due to a high degree of threat activity relating to that data. The other sensors 802(n) are not experiencing such threats. While not specifically indicated in FIG. 8, one or more sensors in a DCF may be color coded in the heat map view 820. Thus, sensors 3 and 9 may be colored red, and one or more of the remaining sensors colored green. Some sensors may be colored yellow, for example, to indicate a 'medium' threat severity level. In general, a heat map color may correspond to a data confidence score of the associated sensor, although no particular scheme is required for the information disclosed in a heat map.

With continued reference to FIG. 8, another possible view that may be generated by embodiments of the invention based on DCF ledger data is a data-specific threat view 830. A user may define a query that enables the user to drill down on any specific piece of data and explore the threat environment that the sensor, which produced and/or collected that data, was experiencing at the time the data was being ingested.

Still another example view that may be generated by embodiments of the invention based on DCF ledger data is a historical threat view 840. The ledger is a time-ordered view of threats to data. The confidence scores and/or trust insertion metadata may be displayed over time to enable a user to see how the threats, severities, or confidence is rising/falling. In the illustrated example, it can be seen that the threat level is declining with the passage of time. The historical threat view 840 may be filtered to focus on individual threats (e.g., how much ransomware activity is occurring overtime), individual data (what is this sensor experiencing over time), or on any other basis. Note that over time, and possibly based on human insight, such as an operator in an SOC, the original confidence score may be modified, either up or down. The historical threat view 840 may use human insight modifiers, discussed below, to emphasize areas in which confidence scores have changed, and to reveal the values of the new confidence scores.

As a final example of views that may be generated by one or more embodiments of the invention, FIG. 8 discloses a risk assessment view 850. In this view, one or more entries in the ledger 804 may highlight areas of data ingest where threats are active but specific prevention for that threat is not. In the example of FIG. 8, sensor 3 may be identified as a risk since it is not configured to repel a rootkit attack. A risk assessment view 850, like the other example views disclosed herein, may be supplemented with, and/or informed by, additional information. For example, the risk assessment view 850 may be informed with other trust insertion metadata present in the ledger 804 such as, for example, provenance information that describes the ingest environment, including O/S versions, driver versions, and the presence of hardware (HW) root of trust technology. As used herein, root of trust is a concept that starts a chain of trust needed to ensure a computer boots with legitimate code. Thus, for example, if the first piece of code executed has been verified as legitimate, those credentials are trusted by the execution of each subsequent piece of code.

It was noted earlier that human insight modifiers may be employed in connection with some embodiments of the invention, including embodiments that provide for various different threat portfolio views. One circumstance that may occur is that, at some point after a confidence score is written to an immutable ledger, an SOC investigation or other inquiry may conclude that the initial score calculation should be revisited. For example, what was initially characterized as 'high' risk was actually a false positive and, thus, the confidence score should be modified to reflect the actual state of affairs.

To enable this functionality, some embodiments of the invention may provide for an immutable ledger entry with a confidence score that may include, or reference, a "bread crumb" that references any potential SOC workflow(s). The bread crumb may be a unique ID that was generated during initial scoring and placed into the ledger entry. When a historical threat view is created, for example, the portfolio viewing tool may perform a query to see if any given ID has undergone human workflow analysis, as well as whether or not such analysis produced a different conclusion as to the confidence score, and/or other parameters, associated with the data to which the initial confidence score was assigned. In one alternative embodiment, a new ledger entry may be created which modifies the confidence score included in the original or preceding ledger entry, while also referencing the original ledger entry.

As exemplified by the disclosure herein, embodiments of the invention may, by allowing trust insertion components to contribute a score range, as opposed being limited to a binary success/failure evaluation, and metadata to a DCF, a rich and useful picture of ecosystem-wide confidence in the DCF data may be provided. Moreover, the ability of a trust insertion component, such as a security technology, to feed threat-specific data and scores for specific time ranges may provide a broad reporting capability not presently employed or available in edge computing systems and environments. As well, the ability, provided in embodiments of the invention, to associate those threats with specific data sources and data streams may also be valuable, as such ability may allow an enterprise to understand more clearly which edge data assets are being targeted by malicious entities. With this information, a plan may be generated and implemented to deal with the threats. Finally, embodiments of the invention may enable an enterprise to get a heads-up about potential copycat versions of their data in the market via the data exfiltration capabilities disclosed herein. In this way, for example, investigators/monitors may be able look for that data, such as in a black market for example, and then eliminate the data.

E. Example Methods

Figure 9:
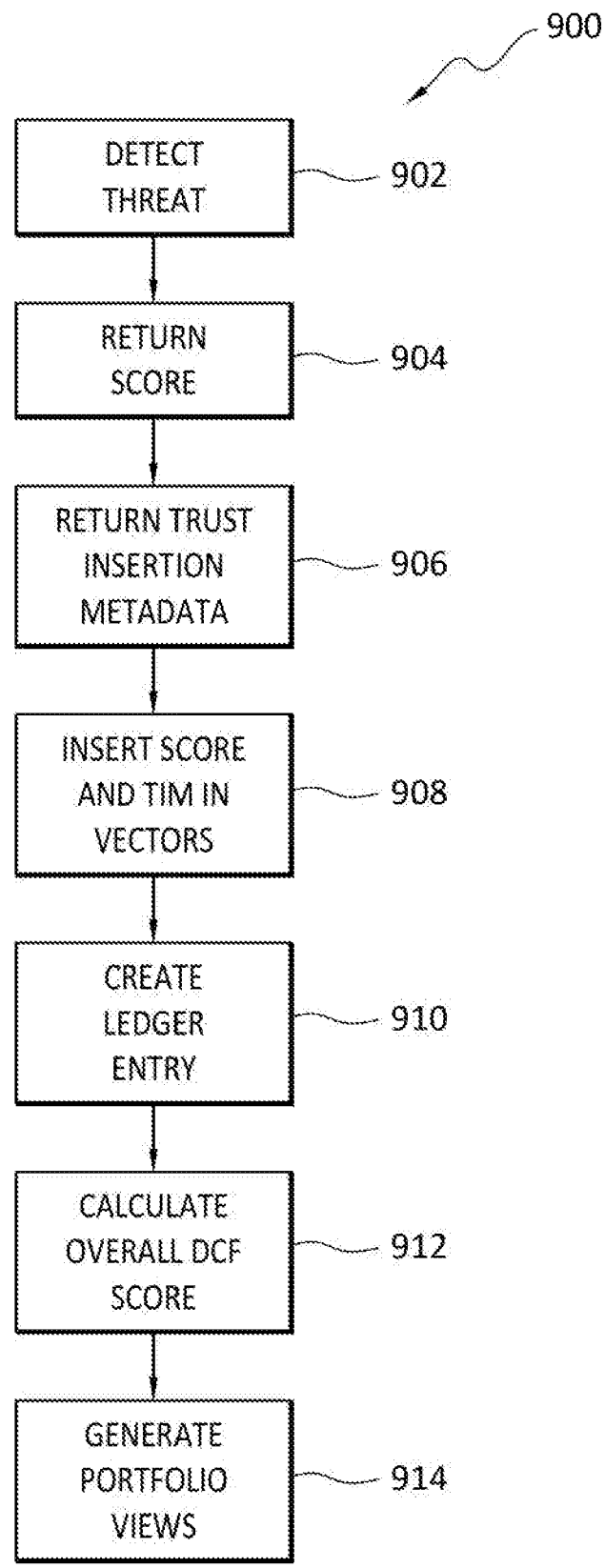
FIG. 9 discloses an example method.

Attention is directed now to FIG. 9, where methods are disclosed for scoring of detected threats, and related processes, where one example method is denoted generally at 900. It is noted with respect to the example method of FIG. 9, as well as to any of the other disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

The example method 900 may be performed in its entirety, in a DCF, although that is not necessarily required. At least some of the method 900 may be performed at a particular layer of a DCF, such as a gateway for example. More generally however, it is not required that the method 900 be performed by any particular entity, or group of entities.

With particular attention now to FIG. 9, the method 900 may begin when a threat is detected 902 at a layer, or layers, of a DCF. In some embodiments, the threat may be detected by a security technology operating at a gateway of the DCF. In some embodiments, the threat that is detected 902 may be a threat to the security and/or integrity of data passing through a layer of the DCF, such as a gateway, although other types of threats may be detected.

After the threat has been detected 902, a data confidence score, or simply 'confidence score' or 'score,' may be calculated and returned 904 concerning data implicated by the threat. The confidence score may, for example, be any integer, or non-integer, from 0 to 1, inclusive. In some embodiments, the magnitude of the confidence score is based upon the severity of the detected threat, and the possible, and/or actual, consequences of the threat with respect to the data passing through the layer where the threat was detected. Thus, for example, a minimally consequential threat may result in a data confidence score of 0.8, while a threat that corrupts the data may result in a data confidence score of 0.2. The data confidence score may be adjusted up, or down, relative to its initial value, based on other input.

In addition to generation of the confidence score 904, trust insertion metadata may also be generated 906. The trust insertion metadata may, in some embodiments at least, be generated by the same entity that detected the threat 902 and generated the confidence score 904, although that is not necessarily required. The trust insertion metadata may relate to the particular threat detected and may comprise, for example, the frequency with which the threat occurred, when the threat occurred, and the threat type.

The trust insertion metadata and the confidence score that were returned at 906 and 904 may be inserted into respective vectors 908. Particularly, the trust insertion metadata may be inserted in a trust insertion metadata vector 908, and the confidence score inserted in at trust insertion range vector 908. The trust insertion metadata vector may also comprise trust insertion metadata concerning respective trust insertion processes performed by elements of the DCF other than a security technology/gateway, and that trust insertion metadata may concern aspects of the DCF other than threat detection. As well, the trust insertion range vector, may comprise one or more non-integer and/or integer values that each respectively correspond to a trust insertion process performed by a respective component of the DCF.

Next, information from the trust insertion metadata vector and trust insertion range vector may be combined to create a ledger entry 910. One example embodiment of a ledger entry may comprise trust insertion metadata and a data confidence score concerning the data to which the trust insertion metadata relates. In some embodiments, the ledger entry may also comprise the data itself. One, some, or all, of the ledger entries may then be used to create an overall data confidence score for the DCF 912. In one relatively simple approach, the confidence scores may be averaged across all the ledger entries to create the overall DCF data confidence score 912. In other embodiments, the confidence scores may be weighted, and the overall data confidence score for the DCF 912 generated using the weighted confidence scores.

Finally, the ledger entries may be used to generate one or more threat portfolio views 914. The threat portfolio view may identify, for example, sensors or other IoT devices with relatively low data confidence scores, data-specific threats, historical threat views, and/or risk assessment views, among others. These views may be presented to a user in graphical form, for example, and may be presented on a user terminal, mobile communication device, and/or any other systems or devices capable of graphically displaying and/or otherwise presenting threat portfolio view information.

E. Further Example Embodiments

Following are some further example embodiments of the invention. These are presented only by way of example and are not intended to limit the scope of the invention in any way.

Embodiment 1. A method, comprising: detecting a threat in a data N Y confidence fabric; assigning a data confidence score to data implicated by the threat; generating trust insertion metadata concerning the threat; creating a ledger entry based on the data confidence score and the trust insertion metadata; and using the ledger entry to determine an overall data confidence score for the data confidence fabric.

Embodiment 2. The method as recited in embodiment 1, wherein the threat is detected by a security technology running on a gateway of the data confidence fabric.

Embodiment 3. The method as recited in any of embodiments 1-2, wherein the overall data confidence score is also based on trust insertion metadata generated by one or more devices in the data confidence fabric other than a device that detected the threat.

Embodiment 4. The method as recited in any of embodiments 1-3, wherein the entity that assigns the data confidence score is configured to assign both integer, and non-integer, data confidence scores.

Embodiment 5. The method as recited in any of embodiments 1-4, further comprising adjusting the data confidence score.

Embodiment 6. The method as recited in any of embodiments 1-5, wherein the data is generated and/or collected by an IoT device.

Embodiment 7. The method as recited in any of embodiments 1-6, wherein the trust insertion metadata is added to a trust insertion metadata vector, and the data confidence score is added to a trust insertion range vector, and the overall data confidence score of the data confidence fabric is based on the trust insertion range vector and the trust insertion metadata vector.

Embodiment 8. The method as recited in any of embodiments 1-7, further comprising generating a data threat portfolio view based on the data confidence score and the trust insertion metadata.

Embodiment 9. The method as recited in any of embodiments 1-8, further comprising presenting a graphical display of a data threat portfolio view that was generated based on the data confidence score and the trust insertion metadata.

Embodiment 10. The method as recited in any of embodiments 1-9, wherein the data passes through an entity that detects the threat.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
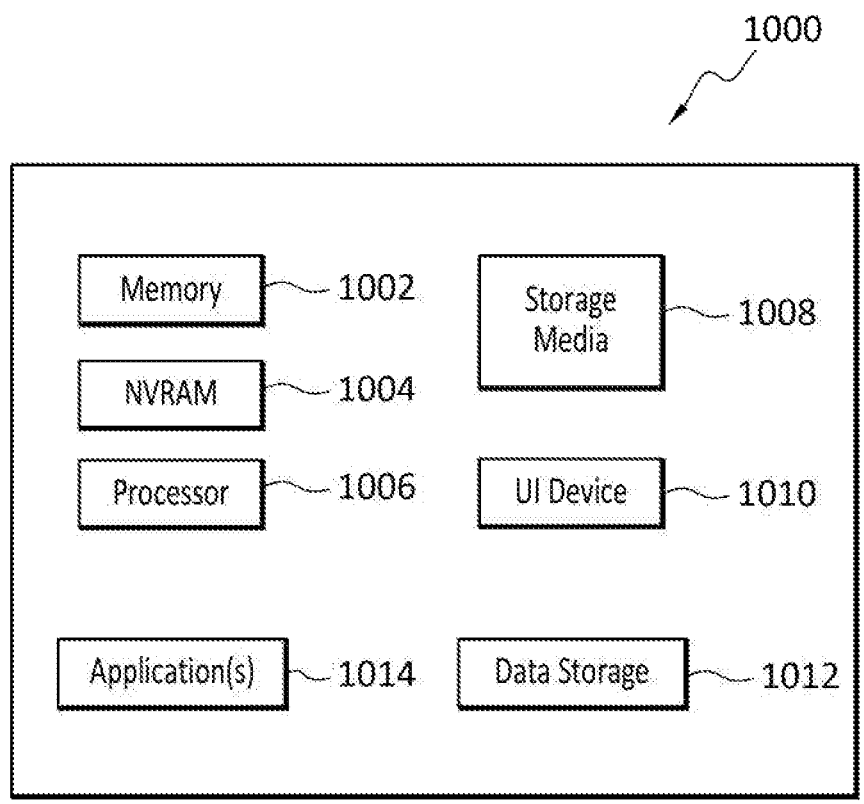
FIG. 10 discloses aspects of an example computing entity.

With reference briefly now to FIG. 10, any one or more of the entities disclosed, or implied, by FIGS. 1-9 and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile random access memory (NVRAM) 1004, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for scoring a confidence score of a data confidence fabric (DCF) including a plurality of layers, comprising:
   monitoring and detecting a plurality of threats to data flowing through the DCF for a monitoring period;
   assigning a data confidence score to data implicated by the threat by comparing a bitmap result with a bitmap configuration;
   generating a trust insertion metadata (TIM) vector concerning types of the plurality of threats to the data and a trust insertion range (TIR) vector including a dynamic range of confidence scores related to the plurality of threats;
   receiving data generated by one device in one layer of the plurality of layers;
   assigning a data confidence score to the data based on the TIM vector, the TIR vector, and a trust inspection configuration;
   creating a ledger entry based on the data, the data confidence score, and the TIM vector in a decentralized DCF framework;
   determining an overall data confidence score for the data confidence fabric based on ledger entries;
   repelling the plurality of threats to the DCF, by a security technology, based on the data confidence score; and
   displaying a data threat portfolio view based on the overall data confidence score and the ledger entries to present identification of the plurality of threats to the DCF on a user's terminal,
   wherein the bitmap result and the bitmap configuration include a series of bits, each bit representing an event of a trust insertion operation.

2. The method as recited in claim 1, wherein the plurality of threats is detected by the security technology running on a gateway of the DCF.

3. The method as recited in claim 1, wherein the overall data confidence score is also based on trust insertion metadata generated by one or more devices in the DCF other than a device that detected the threat.

4. The method as recited in claim 1, wherein the data confidence score is an integer or a non-integer.

5. The method as recited in claim 1, further comprising adjusting the data confidence score.

6. The method as recited in claim 1, wherein the data is generated and/or collected by an IoT device.

7. The method as recited in claim 1, wherein the trust insertion metadata is added to the TIM vector, and the data confidence score is added to the TIR vector, and the overall data confidence score of the DCF is based on the TIR vector and the Tim vector.

8. A non-transitory storage medium having stored therein instructions that are executable by one or more hardware processors to perform operations for scoring a confidence score of a data confidence fabric (DCF), the operations comprising:

monitoring and detecting a plurality of threats to data flowing through the DCF for a monitoring period;

assigning a data confidence score to data implicated by the threat by comparing a bitmap result with a bitmap configuration;

generating a trust insertion metadata (TIM) vector concerning types of the plurality of threats to the data and a trust insertion range (TIR) vector including a dynamic range of confidence scores related to the plurality of threats;

receiving data generated by one device in one layer of the plurality of layers;

assigning a data confidence score to the data based on the TIM vector, the TIR vector, and a trust inspection configuration;

creating a ledger entry based on the data, the data confidence score, and the TIM vector in a decentralized DCF framework;

determining an overall data confidence score for the data confidence fabric based on ledger entries;

repelling the plurality of threats to the DCF, by a security technology, based on the data confidence score; and displaying a data threat portfolio view based on the overall data confidence score and the ledger entries to present identification of the plurality of threats to the DCF on a user's terminal, wherein the bitmap result and the bitmap configuration include a series of bits, each bit representing an event of a trust insertion operation.

9. The non-transitory storage medium as recited in claim 8, wherein the plurality of threats is detected by the security technology running on a gateway of the DCF.

10. The non-transitory storage medium as recited in claim 8, wherein the overall data confidence score is also based on trust insertion metadata generated by one or more devices in the DCF other than a device that detected the threat.

11. The non-transitory storage medium as recited in claim 8, wherein the data confidence score is an integer or a non-integer.

12. The non-transitory storage medium as recited in claim 8, wherein the operations further comprise adjusting the data confidence score.

13. The non-transitory storage medium as recited in claim 8, wherein the data is generated and/or collected by an IoT device.

14. The non-transitory storage medium as recited in claim 8, wherein the trust insertion metadata is added to the TIM vector, and the data confidence score is added to the TIR vector, and the overall data confidence score of the DCF is based on the TIR vector and the TIM vector.

15. The method as recited in claim 1, wherein the data threat portfolio view includes a heat map view based on a threat severity level of each of a plurality of devices in the plurality of layers in the DCF.

16. The method as recited in claim 1, wherein the data threat portfolio view includes a data specific threat view based on threat environment on any specific piece of the data.

17. The method as recited in claim 1, wherein the data threat portfolio view includes a historical threat view based on a trend of threats to the data over time.

18. The method as recited in claim 1, wherein the data threat portfolio view includes a risk assessment view based on areas of data ingest where threats are active.

19. The method as recited in claim 1, wherein the security technology is an RSA Internet of Things (IoT) security monitor technology.

* * * * *